United States Patent
Hongo

(10) Patent No.: US 12,011,793 B2
(45) Date of Patent: Jun. 18, 2024

(54) MAIN SPINDLE MONITORING DEVICE AND MAIN SPINDLE MONITORING METHOD OF MACHINE TOOL

(71) Applicant: OKUMA CORPORATION, Niwa-Gun (JP)

(72) Inventor: Takumi Hongo, Niwa-Gun (JP)

(73) Assignee: Okuma Corporation, Niwa-Gun (JP)

(*) Notice: Subject to any disclaimer, the term of this patent is extended or adjusted under 35 U.S.C. 154(b) by 888 days.

(21) Appl. No.: 17/021,053

(22) Filed: Sep. 15, 2020

(65) Prior Publication Data
US 2021/0101241 A1  Apr. 8, 2021

(30) Foreign Application Priority Data

Oct. 4, 2019 (JP) ................................ 2019-183960

(51) Int. Cl.
B23Q 15/12 (2006.01)
(52) U.S. Cl.
CPC .................... B23Q 15/12 (2013.01)
(58) Field of Classification Search
CPC .............. B23Q 15/12; B23Q 17/00; G05B 2219/37285; G05B 2219/42328; G05B 19/4062
See application file for complete search history.

(56) References Cited

U.S. PATENT DOCUMENTS

| | | | | |
|---|---|---|---|---|
| 2006/0142893 | A1* | 6/2006 | Yasugi | G05B 19/4065 702/182 |
| 2020/0164477 | A1* | 5/2020 | Isobe | G05B 19/406 |

FOREIGN PATENT DOCUMENTS

| | | |
|---|---|---|
| CN | 109507952 A | 3/2019 |
| JP | S57-158538 A | 9/1982 |
| JP | 2005-074545 A1 | 3/2005 |
| JP | 2006-205350 A | 8/2006 |
| JP | 2016-078126 A | 5/2016 |

OTHER PUBLICATIONS

Japanese Office Action (with English translation) dated Jan. 31, 2023 (Application No. 2019-183960).
Chinese Office Action (with English translation) dated Dec. 15, 2023 (Application No. 202011064082.8).

* cited by examiner

Primary Examiner — Matthew G Marini
Assistant Examiner — Leo T Hinze
(74) Attorney, Agent, or Firm — BURR PATENT LAW, PLLC

(57) ABSTRACT

A main spindle monitoring device determines an abnormality of a main spindle in a machine tool. The main spindle monitoring device includes a main spindle operation monitoring unit and a feed axis operation monitoring unit. The main spindle operation monitoring unit monitors a change of an operation condition of the main spindle based on a main spindle load. The feed axis operation monitoring unit monitors a change of an operation condition of a feed axis based on a feed axis load. The abnormality of the main spindle is determined when the main spindle operation monitoring unit detects the change of the operation condition of the main spindle and the feed axis operation monitoring unit does not detect the change of the operation condition of the feed axis in a state where a constant rotation speed is commanded to the main spindle while the feed axis is driving.

3 Claims, 2 Drawing Sheets

MAIN SPINDLE MONITORING DEVICE AND MAIN SPINDLE MONITORING METHOD OF MACHINE TOOL

BACKGROUND

This application claims the benefit of Japanese Patent Application Number 2019-183960 filed on Oct. 4, 2019, the entirety of which is incorporated by reference.

TECHNICAL FIELD

The disclosure relates to a main spindle monitoring device and a main spindle monitoring method for determining an abnormality of a main spindle in a machine tool that performs a machining of a workpiece while rotating a tool mounted to the main spindle or the workpiece.

RELATED ART

In a machine tool that performs a machining of a workpiece while rotating a tool mounted to a main spindle or the workpiece, a trouble, such as a deterioration of operation accuracy and an abnormal noise during the operation, occurs in some cases. The trouble is caused by a preload loss due to an abrasion of a bearing by an aged deterioration and a damage due to an entrance of foreign matter, poor lubrication, and the like. In the above described machine tool, a processing defect, such as a bad shape of the machined object and a poor property of machined surface, occurs to adversely affect production. When a malfunction, such as burn-out of a main spindle, occurs, the main spindle becomes unrottable and the machine tool cannot be even operated in some cases.

In view of the above, the machine tool includes a monitoring device that monitors a load and the like of the machine tool to issue an alarm when the load exceeds a threshold or to stop the operation of the machine tool. However, there has been a problem in that since the threshold is set in consideration of the influence of the machining, the threshold becomes a relatively large value. Therefore an abnormality is not detected until it becomes serious, for example, an excessive machining load, but a change of a condition of the main spindle itself is not detected.

For that reason, JP-A-2005-74545 discloses a method as a main spindle monitoring device of the machine tool. In the method, a control device of the machine determines a state where a cutting work is not being performed, for example, a state where a main spindle is rotating while a feed axis is not being moved. Data of an AE vibration sensor mounted to the main spindle is retrieved as a measured value to avoid an influence of the machining, thus sensing a condition change of a bearing of the main spindle from an early stage.

However, in the method of JP-A-2005-74545, it might be difficult to find an abnormal phenomenon at the early stage of the cutting work, such as a malfunction of a main spindle lubrication unit and an entrapment of a foreign matter, and a sign that suddenly occurs since the data when the cutting work is not being performed is used.

An object of the disclosure is to provide a main spindle monitoring device and a main spindle monitoring method for a machine tool configured to monitor a condition of a main spindle even during a cutting work.

SUMMARY

In order to achieve the above-described object, there is provided a main spindle monitoring device according to a first aspect of the disclosure. The main spindle monitoring device determines an abnormality of a main spindle in a machine tool. The machine tool performs a machining of a workpiece while rotating a tool mounted to the main spindle or the workpiece and driving a moving body by a feed axis. The main spindle monitoring device includes a main spindle operation monitoring unit and a feed axis operation monitoring unit. The main spindle operation monitoring unit monitors a change of an operation condition of the main spindle based on a main spindle load. The feed axis operation monitoring unit monitors a change of an operation condition of the feed axis based on a feed axis load. The abnormality of the main spindle is determined when the main spindle operation monitoring unit detects the change of the operation condition of the main spindle and the feed axis operation monitoring unit does not detect the change of the operation condition of the feed axis in a state where a constant rotation speed is commanded to the main spindle while the feed axis is driving.

In a main spindle monitoring device according to a second aspect of the disclosure, which is in the first aspect of the disclosure, the main spindle operation monitoring unit calculates a change amount of an absolute value of the main spindle load per unit time, and determines the operation condition of the main spindle to have changed when the change amount of the absolute value exceeds a preset threshold.

In a main spindle monitoring device according to a third aspect of the disclosure, which is in the first or second aspect of the disclosure, the feed axis operation monitoring unit determines the operation condition of the feed axis not to have changed when a change amount of an absolute value of the feed axis load per unit time is below a preset threshold, and/or when a_change amount of a variation width of the feed axis load per unit time is below a preset threshold.

In order to achieve the above-described object, there is provided a main spindle monitoring method according to a fourth aspect of the disclosure. The main spindle monitoring method determines an abnormality of a main spindle in a machine tool. The machine tool performs a machining of a workpiece while rotating a tool mounted to the main spindle or the workpiece and driving a moving body by a feed axis. The main spindle monitoring method includes a main spindle operation monitoring step of monitoring a change of an operation condition of the main spindle based on a main spindle load in a state where the main spindle is rotating at a constant rotation speed, a feed axis operation monitoring step of monitoring a change of an operation condition of the feed axis based on a feed axis load in a state where the feed axis is driving, and a determination step of determining the abnormality of the main spindle when the main spindle operation monitoring step detects the change of the operation condition of the main spindle and the feed axis operation monitoring step does not detect the change of the operation condition of the feed axis.

According to the disclosure, the condition of the main spindle can be monitored even during the cutting work, and the abnormality of the main spindle of the machine tool can be early detected.

DETAILED DESCRIPTION

The following describes an embodiment of the disclosure based on the drawings.

Figure 1:
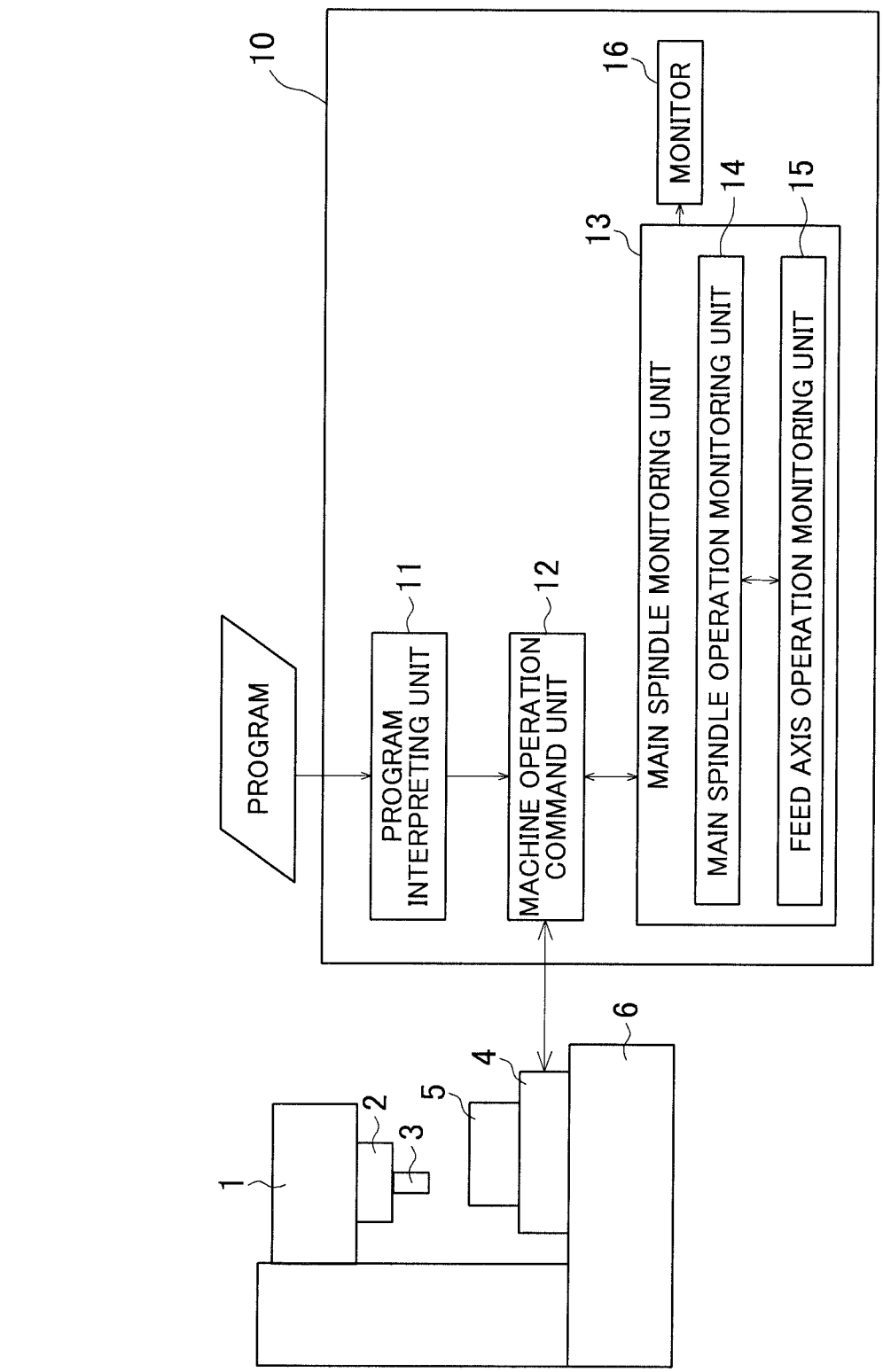
FIG. 1 is a block configuration diagram illustrating an exemplary machine tool.

FIG. 1 is a block configuration diagram illustrating an exemplary machine tool. A main spindle housing 1 of the machine tool includes a main spindle 2 rotatable by a main spindle motor, and a tool 3 is mounted to the distal end of the main spindle 2. The main spindle housing 1 as a moving body is movable in a Z-axis direction. A workpiece 5 is secured on a table 4 as a moving body, and the table 4 is movable on a bed 6 in mutually orthogonal X-axis direction and Y-axis direction. Here, the tool 3 and the workpiece 5 are relatively moved to perform a machining of the workpiece 5.

An NC device 10 that controls the machine tool includes a program interpreting unit 11 and a machine operation command unit 12 to perform the machining of the workpiece 5. The program interpreting unit 11 interprets a program input by an operator through input means (not illustrated) as a main spindle rotation command and a feed axis operation command. The machine operation command unit 12 controls the main spindle motor, each of feed axis motors, and the like based on the command sent from the program interpreting unit 11.

The NC device 10 includes a main spindle monitoring unit 13. The main spindle monitoring unit 13 uses a main spindle operation monitoring unit 14 and a feed axis operation monitoring unit 15 to monitor information on control, for example, a main spindle load and loads of the feed axes, such as the X-axis, the Y-axis, and a Z-axis, generated by the machine operation command unit 12. The main spindle monitoring unit 13 aggregates conditions of the main spindle operation and the feed axis operation. Then, when an abnormal operation of the main spindle 2 is determined, the main spindle monitoring unit 13 performs a process, such as sending a machine stop command to the machine operation command unit 12 or informing a monitor 16 of the detection of the abnormality of the main spindle 2.

Figure 2:
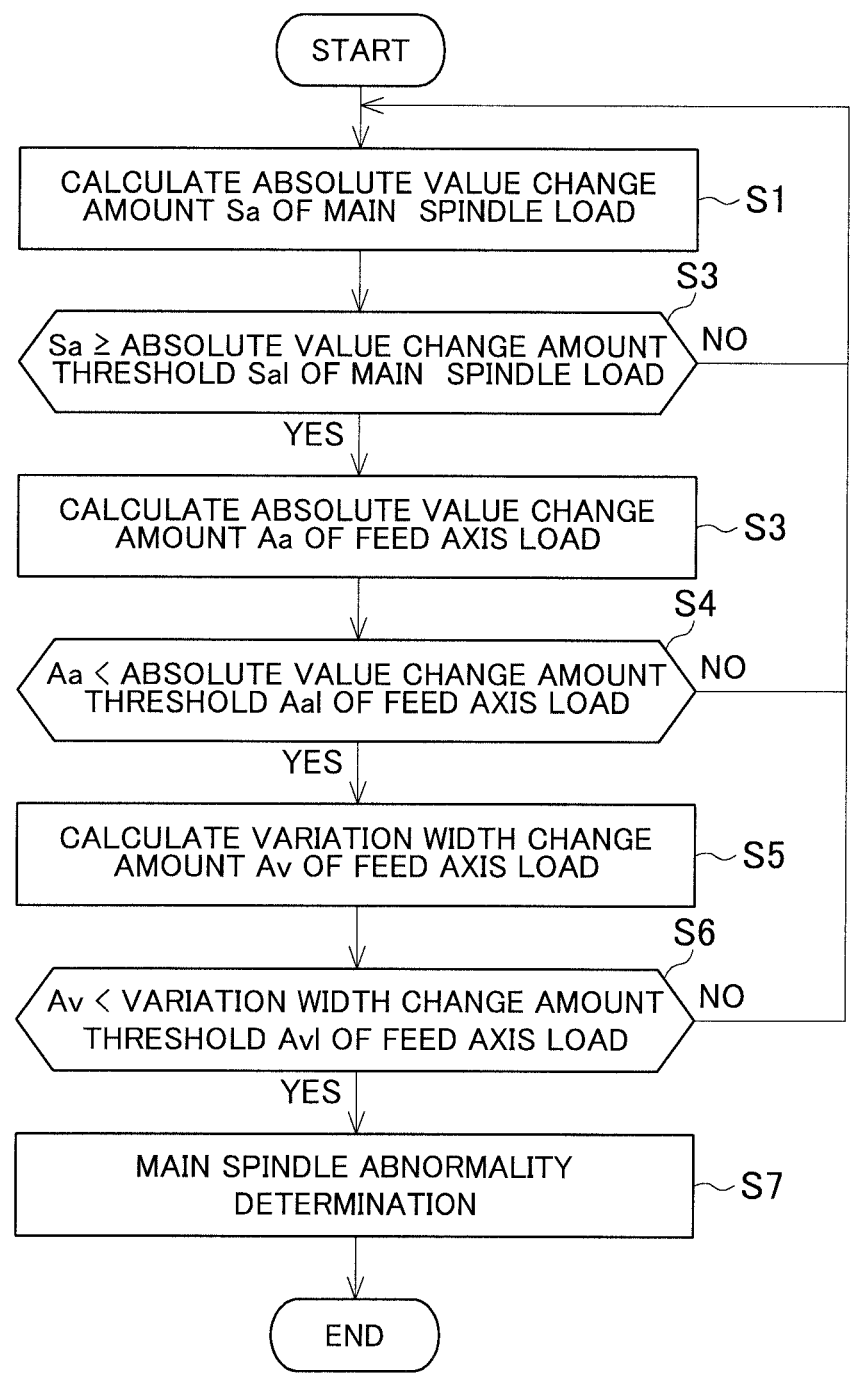
FIG. 2 is a flowchart illustrating a procedure of a main spindle monitoring method.

Next, a monitoring method by the main spindle monitoring unit 13 will be described based on the flowchart of FIG. 2.

First, an absolute value change amount Sa of the main spindle load is calculated (S1), and the absolute value change amount Sa of the main spindle load is compared with a preset absolute value change amount threshold Sal of the main spindle load (S2). The process is performed by the main spindle operation monitoring unit 14.

The absolute value change amount Sa of the main spindle load is obtained by a calculation in which a difference between an average value of the main spindle calculated in every cycle of one rotation of the main spindle and the average value of the main spindle calculated in the cycle one rotation before as an absolute value is calculated. The main spindle load (for example, a load signal corresponding to a required electric power or a required torque of the main spindle motor) is generated in a control cycle of the machine tool. It should be noted that the calculation is performed when the command of the main spindle rotation speed indicates a constant speed, and is not performed when the main spindle 2 is accelerated or decelerated.

When the absolute value change amount Sa of the main spindle load is equal to or more than the absolute value change amount threshold Sal of the main spindle load (YES in S2) in the determination of S2, the operation condition of the main spindle is determined to have changed and the process proceeds to the next step. Meanwhile, when the absolute value change amount Sa of the main spindle load is less than the absolute value change amount threshold Sal of the main spindle load, the operation condition of the main spindle is determined not to have changed and the process returns to S1 in the next cycle.

Next, an absolute value change amount Aa of the feed axis load is calculated (S3), and the absolute value change amount Aa of the feed axis load is compared with a preset absolute value change amount threshold Aal of the feed axis load (S4).

The absolute value change amount Aa of the feed axis load is, similarly to the absolute value change amount of the main spindle load, obtained by a calculation in which a difference between an average value of the feed axis load calculated for every cycle of one rotation and the average value of the feed axis load calculated in the cycle one rotation before as an absolute value is calculated. A load (for example, a load signal corresponding to a required electric power or a required torque of the feed axis motor) is each feed axis, such as the X-axis, the Y-axis, and the Z-axis. Here, a maximum value of the absolute value change amounts of the loads of the respective feed axes is employed as the absolute value change amount Aa of the feed axis load. While one threshold Aal is used here, the threshold may be set for each feed axis for the determination.

When the absolute value change amount Aa of the feed axis load is below the absolute value change amount threshold Aal of the feed axis load (YES in S4) in the determination of S4, the operation condition of the feed axis is determined not to have changed and the process proceeds to the next step. When the absolute value change amount Aa of the feed axis load is equal to or more than the absolute value change amount threshold Aal of the feed axis load, the operation condition of the feed axis is determined to have changed and the process returns to S1.

Next, a variation width change amount Av of the feed axis load is calculated (S5), and the variation width change amount Av of the feed axis load is compared with a preset variation width change amount threshold Avl of the feed axis load (S6).

The variation width change amount Av of the feed axis load is obtained by a calculation in which, the load of each feed axis, such as the X-axis, the Y-axis, and the Z-axis, is calculated having a difference between a maximum value and a minimum value in each cycle of one rotation as a variation width, and an absolute value of a difference from the variation width calculated in the cycle one rotation before is calculated. Here, a maximum value of the variation width change amounts of the loads of the respective feed axes is employed as the variation width change amount Av of the feed axis load. While one threshold Avl is used here, the threshold may be set for each feed axis for the determination.

When the variation width change amount Av of the feed axis load is below the variation width change amount threshold Avl of the feed axis load (YES in S6) in the determination of S6, it indicates that the operation condition of the main spindle has changed while the operation condition of the feed axis has not changed. Accordingly, in S7, the main spindle 2 is determined to be abnormal, and the machine is stopped. The process is performed by the feed axis operation monitoring unit 15. Meanwhile, when the variation width change amount Av of the feed axis load is equal to or more than the variation width change amount threshold Avl of the feed axis load, the operation condition of the feed axis is determined to have changed and the process returns to S1.

As described above, the main spindle monitoring device (NC device 10) and the main spindle monitoring method of the embodiment include the main spindle operation monitoring unit 14 (main spindle operation monitoring means) and the feed axis operation monitoring unit 15 (feed axis operation monitoring means). The main spindle operation monitoring unit 14 (main spindle operation monitoring means) monitors the change of the operation condition of the main spindle 2 based on the main spindle load (executes the main spindle operation monitoring steps S1, S2). The feed axis operation monitoring unit 15 (feed axis operation monitoring means) monitors the change of the operation condition of the feed axis based on the feed axis load (executes the feed axis operation monitoring steps S3 to S6). When the main spindle operation monitoring unit 14 detects the change of the operation condition of the main spindle 2 and the feed axis operation monitoring unit 15 does not detect the change of the operation condition of the feed axis in a state where a constant rotation speed is commanded to the main spindle 2 while the feed axis is driving, the main spindle 2 is determined to be abnormal (determination step S7 is executed). Thus, the condition of the main spindle 2 can be monitored even during the cutting work, thereby ensuring detection of an abnormal phenomenon at the early stage of the cutting work, such as a malfunction of a main spindle lubrication unit and an entrapment of a foreign matter, and a sign that suddenly occurs. Accordingly, the abnormality of the main spindle 2 can be early detected.

In the above-described embodiment, the abnormality is determined with the condition that the operation condition of the feed axis has no change when the absolute value change amount Sa of the main spindle load is equal to or more than the absolute value change amount threshold Sa1 in S2. However, stages may be set to the threshold used for comparison in S2 to perform only notification to the monitor in S7 when exceeding the small threshold and stop the machine with the determination of the abnormality in S7 when exceeding the large threshold.

While the absolute value change amount of the main spindle load is described as an example here, similar effects are obtained by using a vibration sensor additionally mounted to the main spindle to substitute a change amount of an RMS value (effective value) and a change amount of the variation width for the absolute value change amount of the main spindle load.

Furthermore, the operation condition of the feed axis is determined not to have changed when the absolute value change amount Aa of the feed axis load is below the absolute value change amount threshold Aa1 of the feed axis load in the determination of S4 and when the variation width change amount Av of the feed axis load is below the variation width change amount threshold Avl of the feed axis load in the determination of S6. However, only one process of any of S3 to S4 and S5 to S6 may be employed to determine the operation condition of the feed axis.

Then, while the above-described embodiment employs the configuration in which the NC device of the machine tool includes the main spindle monitoring device, the main spindle monitoring method may be executed by connecting a main spindle monitoring device disposed separately from the NC device to the NC device wirelessly or by wire. In the case, connecting to the NC devices of a plurality of machine tools ensures collectively determining the abnormality of the main spindles.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims.

What is claimed is:

1. A main spindle monitoring device that determines an abnormality of a main spindle in a machine tool, the machine tool performing a machining of a workpiece while rotating a tool mounted to the main spindle or the workpiece and driving a moving body by a feed axis, the main spindle monitoring device comprising:

a machine operation command unit that controls a motor of the main spindle and a motor of the feed axis, and a main spindle monitoring unit comprising (i) a main spindle operation monitoring unit that monitors a change of an operation condition of the main spindle based on a main spindle load; and (ii) a feed axis operation monitoring unit that monitors a change of an operation condition of the feed axis based on a feed axis load, wherein the abnormality of the main spindle is determined when the main spindle operation monitoring unit detects the change of the operation condition of the main spindle, and the feed axis operation monitoring unit does not detect the change of the operation condition of the feed axis in a state where a constant rotation speed is commanded to the main spindle while the feed axis is driving, wherein the feed axis operation monitoring unit determines the operation condition of the feed axis not to have changed when a change amount of an absolute value of the feed axis load per unit time is below a preset threshold, and when a change amount of a variation width of the feed axis load per unit time is below a preset threshold, and wherein, when the abnormality of the main spindle is determined, the main spindle monitoring unit sends a machine stop command to the machine operation command unit that stops the operation of the machine tool.

2. The main spindle monitoring device of the machine tool according to claim 1, wherein the main spindle operation monitoring unit calculates a change amount of an absolute value of the main spindle load per unit time, and determines the operation condition of the main spindle to have changed when the change amount of the absolute value exceeds a preset threshold.

3. A main spindle monitoring method that determines an abnormality of a main spindle in a machine tool, the machine tool performing a machining of a workpiece while rotating a tool mounted to the main spindle or the workpiece and driving a moving body by a feed axis, the main spindle monitoring method comprising:

controlling a motor of the main spindle and a motor of the feed axis;

monitoring a change of an operation condition of the main spindle based on a main spindle load in a state where the main spindle is rotating at a constant rotation speed;

monitoring a change of an operation condition of the feed axis based on a feed axis load in a state where the feed axis is driving, determining the abnormality of the main spindle when the monitoring of the main spindle detects the change of the operation condition of the main spindle and the monitoring of the feed axis does not detect the change of the operation condition of the feed axis, and issuing a machine stop command stopping operation of the machine tool immediately after determining the abnormality of the main spindle, wherein the monitoring of the feed axis does not detect a change of the operation condition of the feed axis when a change amount of an absolute value of the feed axis load per unit time is below a preset threshold, and when a change amount of a variation of width of the feed axis load per unit time is below a preset threshold.

\* \* \* \* \*